INVENTORS
MICHAEL E. GOLDEN
DENNIS V. BOSLEY
JOHN H. GOETZ
JAMES F. MUNDAY
JOHN W. RYAN

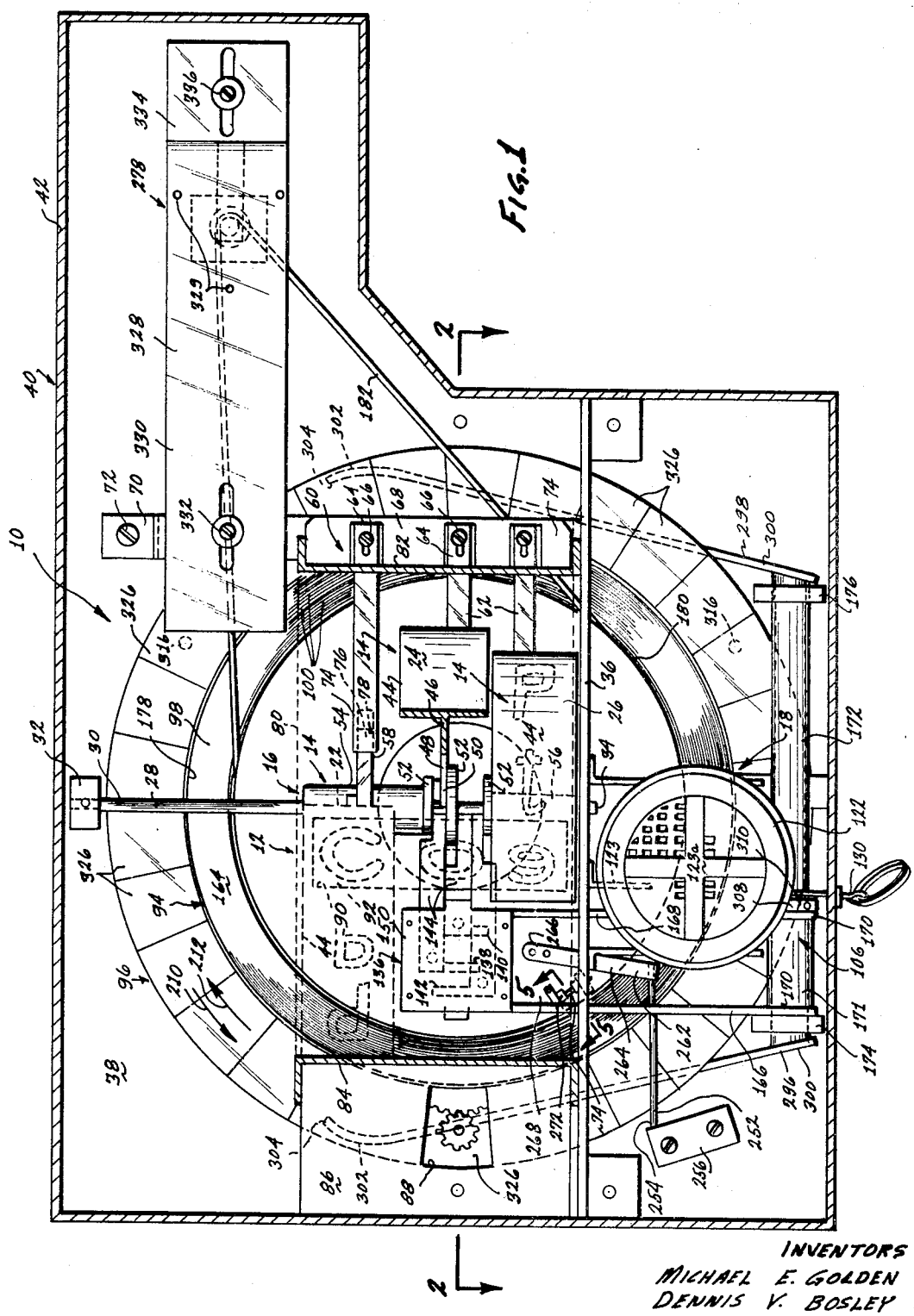

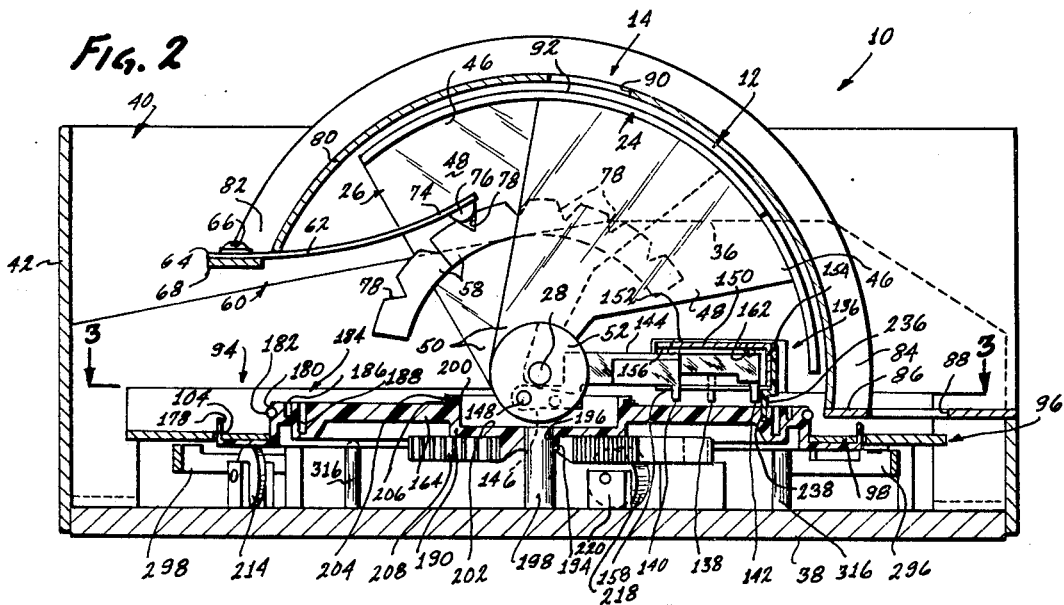
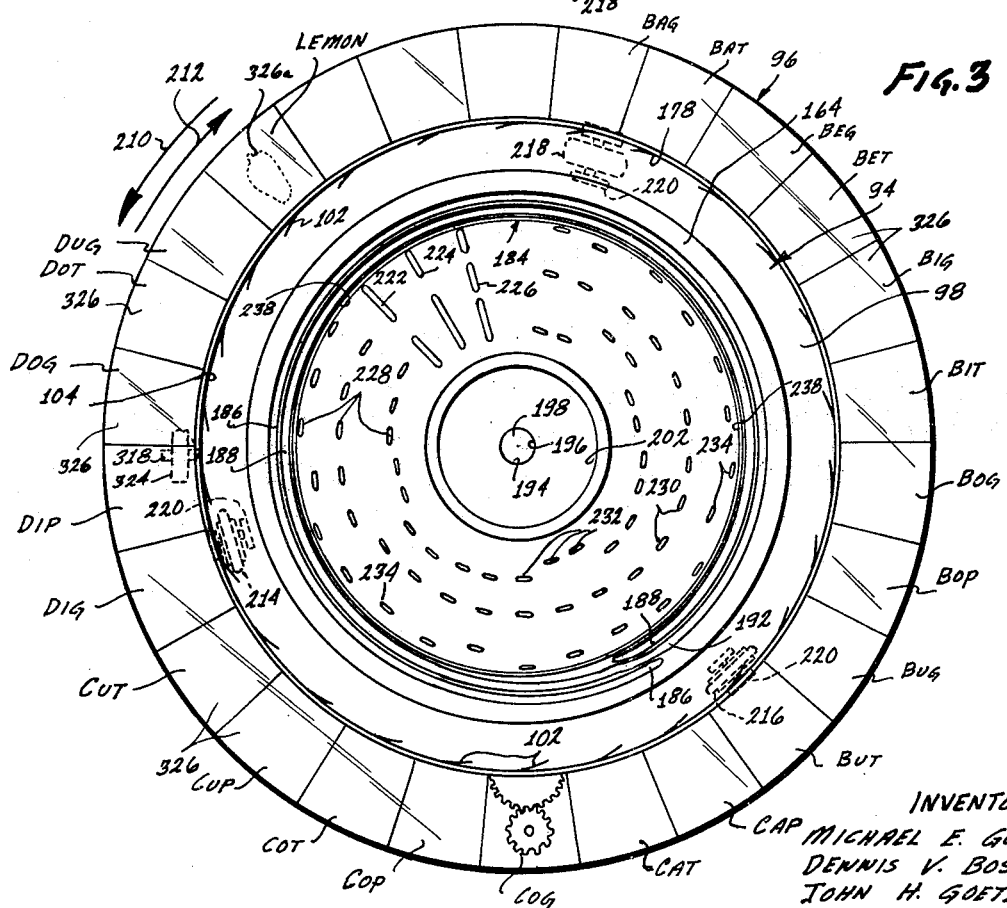

BY Herzig, Walsh & Blackham
ATTORNEYS

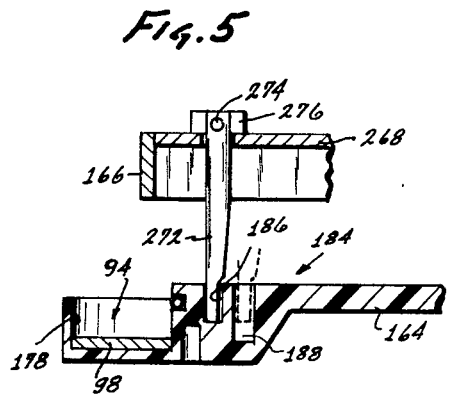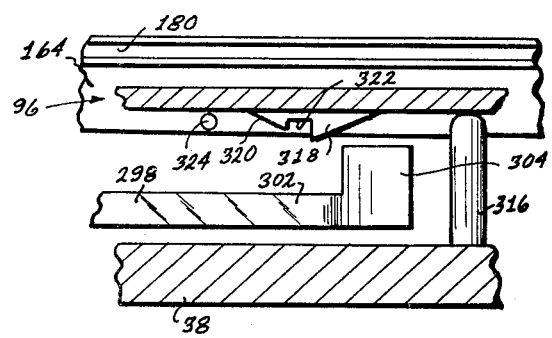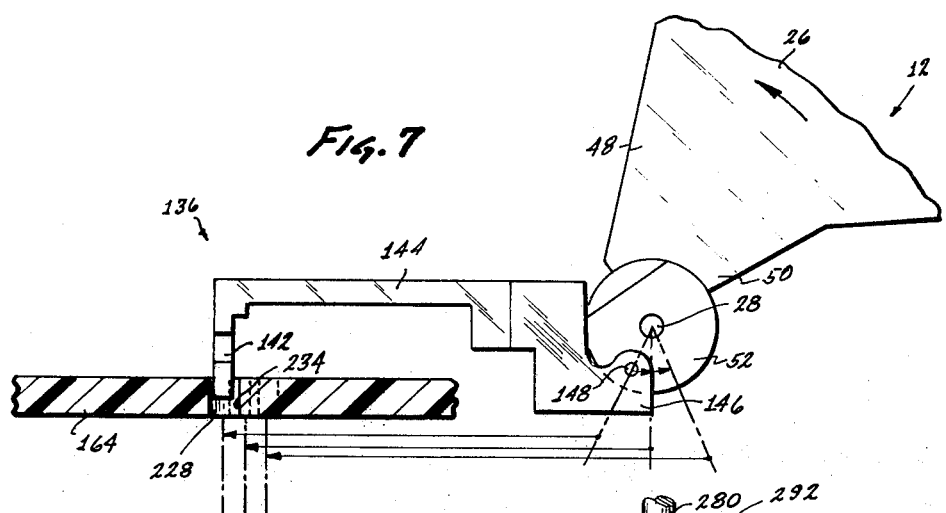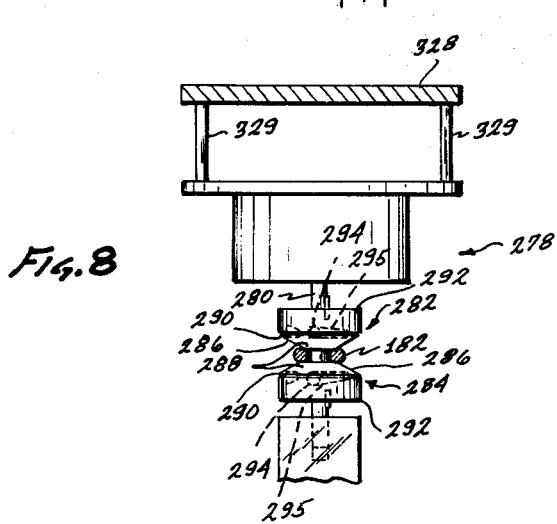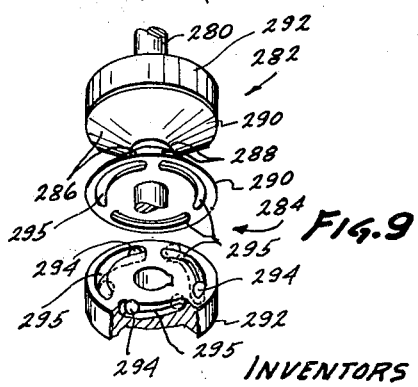

United States Patent Office 3,510,966
Patented May 12, 1970

3,510,966
TEACHING MACHINE TOY HAVING SEQUENTIALLY-ARRANGEABLE INDICIA MEANS AND RESPONSE MEANS
Michael E. Golden, Los Angeles, Denis V. Bosley, Palos Verdes, John H. Goetz, Sherman Oaks, James F. Munday, South Gate, and John W. Ryan, Los Angeles, Calif., assignors to Mattel, Inc., Hawthorne, Calif., a corporation of California
Filed Dec. 8, 1967, Ser. No. 689,165
Int. Cl. G09b 17/00
U.S. Cl. 35—35                                7 Claims

ABSTRACT OF THE DISCLOSURE

A teaching machine toy includes (1) first means identified by indicia, such as letters or numerals, capable of sequential arrangement into meaningful or nonsense array and (2) second means, such as a phonograph, responsive to the array of said first means for producing a response characteristic thereof.

BACKGROUND OF THE INVENTION

The background of the invention will be set forth in two parts:

Field of the invention

The present invention pertains generally to the field of teaching machine toys and more particularly to such toys having sequentially-arrangeable indicia means and responsive means.

Description of the prior art

Teaching machine toys are known from such patents as U.S. Pat. Nos. 1,655,510; 2,435,149; 3,289,325 and 3,325,916. The toy disclosed in Pat. No. 2,435,149 includes a plurality of keys having indicia means provided thereon (letters of the alphabet, words and numerals). Each key includes a stem having an audible response recorded thereon in operative association with a diaphragm which is vibrated when the keys are depressed. With this arrangement, the letter, word or numeral printed on the key will be audibly reproduced when the key is depressed.

One disadvantage of a toy of this type resides in the fact that it does not offer a sufficient challenge to a child-user. For example, if a child actuates the keys bearing the letters C-A-T, he does not hear the word "cat." On the contrary, only the individual letters "C," "A" and "T" are heard.

SUMMARY OF THE INVENTION

In view of the foregoing factors and conditions, characteristic of teaching machine toys, it is a primary object of the present invention to provide a new and useful teaching machine toy not subject to the disadvantages enumerated above and having sequentially-arrangeable indicia means and response means especially designed for producing a single response characteristic of an array produced by multiple actuation of the indicia means.

Another object of the present invention is to provide a new and useful teaching machine toy of the type described which includes indicia capable of sequential arrangement by a child-user to create an array about which he can form a hypothesis as to its meaning and means for verifying or disproving that hypothesis.

Yet another object of the present invention is to provide a new and useful teaching machine toy having indicia capable of sequential arrangement into meaningful or nonsense array, means for sensing the combination produced by the array and means for giving a child-user a reading of the combination as a whole.

According to the present invention, a new and useful teaching machine toy is provided which includes first means identified by indicia capable of sequential arrangement into meaningful or nonsense array and second means for producing a response characteristic of the array produced by the first means.

The first means is shown for purposes of illustration, but not of limitation, as including three dials which are rotatably mounted in aligned, side-to-side relationship. The outside dials carry indicia in the form of three consonants and the middle dial contains the five vowels. A child-user may manipulate these dials to spell three letter words or "non-words," as the case may be.

The second means is shown herein for purposes of illustration, but not of limitation, as including a phonograph record provided with a suitable audible response for each combination which may be produced by sequentially arranging the three dials. These responses are recorded on interleaved, spiral grooves each having a lead-in section at this periphery of the record. The second means also includes a tone arm which is normally biased to a position adjacent the periphery of the record so that the angular position of the record will determine which response is reproduced when the tone arm is brought into operative association with the record. This angular position is determined by a sensing means controlled by the position of the dials.

The teaching machine toy may also be provided with a picture ring which displays a picture characteristic of the array produced by the sequential arrangement of the dials.

The features of the present invention which are believed to be novel are set forth with particularly in the appended claims. The present invention, both as to its organization and manner of operation, together with further objects and advantages thereof, may best be understood by reference to the following description, taken in connection with the accompanying drawings in which like reference characters refer to like elements in the several views;

BRIEF DESCRIPTION OF THE DRAWINGS

FIG. 1 is a horizontal, cross-sectional view of a teaching machine toy constituting a presently preferred embodiment of the invention;

FIG. 2 is a cross-sectional view taken along line 2—2 of FIG. 1;

FIG. 3 is a cross-sectional view taken along line 3—3 of FIG. 2;

FIG. 5 is an enlarged, partial cross-sectional view taken along line 5—5 of FIG. 1;

FIG. 6 is an enlarged, partial cross-sectional view taken along line 6—6 of FIG. 4;

FIG. 7 is an enlarged, partial elevational view, with parts shown in cross-section, of a sensing device actuated by one of the indicia-carrying dials forming part of the toy shown in FIG. 1;

FIG. 8 is an enlarged, partial cross-sectional view of a two-speed, direction-sensitive governor forming part of the toy of FIG. 1; and FIG. 9 is an enlarged, partially exploded perspective view of a portion of the governor shown in FIG. 8.

DESCRIPTION OF THE PREFERRED EMBODIMENT

Figure 4:
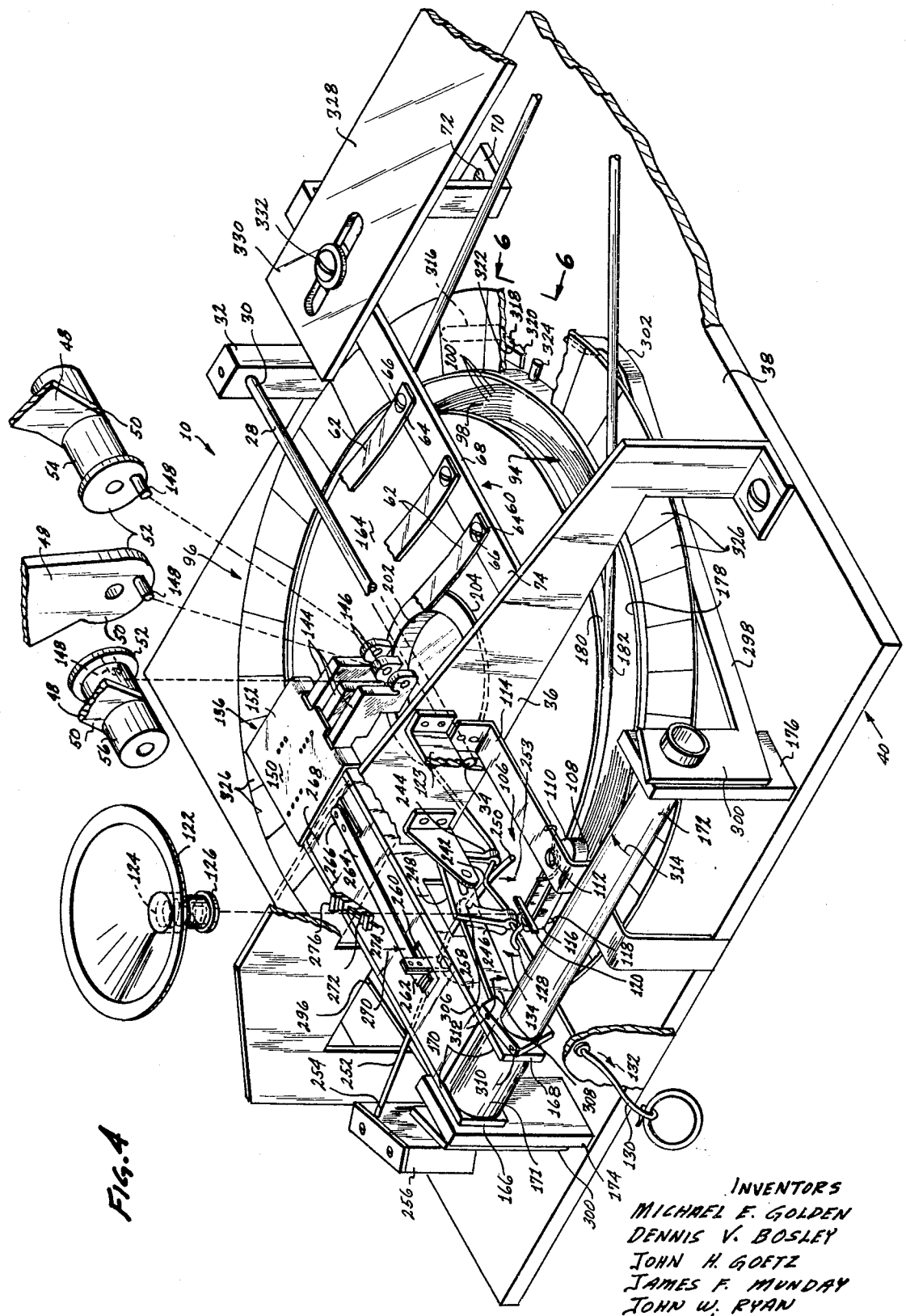
FIG. 4 is an enlarged, exploded partial perspective view of the toy shown in FIG. 1 with parts broken away to show internal construction.

Referring again to the drawings, and more particularly to FIG. 1, a teaching machine toy constituting a presently preferred embodiment of the invention, generally designated 10, comprises first means 12 identified by indicia 14 capable of sequential arrangement into meaningful or nonsense array 16 and second means 18 for producing a response characteristic of the array 16 produced by the first means 12.

Referring now to FIGS. 1, 2 and 4, the first means 12 is shown herein for purposes of illustration, but not of limitation, as including three dials 22, 24 and 26 swingably mounted on a rod 28 having a first end 30 affixed to a post 32, the centre supported through a hub 52 on a turntable pivot 198 and the second end 34 supported by a bridge member 36. The post 32 and the bridge member 36 are affixed to a bottom wall 38 forming part of a housing 40 having an upstanding, encompassing side wall 42. The dials 22, 24 and 26 each includes an arcuate portion 44 affixed to one end 46 of an arm 48 having another end 50 provided with a circular hub 52 swingably connecting an associated dial 22, 24, 26 to the rod 28. The hubs 52 for the dials 22 and 26 are offset from their associated arms 48 by prismatic members 54, 56, respectively, so as to position all of the hubs 52 closely adjacent each other, as shown in FIG. 1. Each arm 48 carries a notched sector 58 engaged by an associated detent means 60 for preventing unwanted pivoting of dials 22, 24 and 26 about rod 28. Each detent means 60 includes a leaf spring 62 having an end 64 affixed, by bolts 66, to an upstanding bracket 68 having a first end 70 secured to bottom wall 38 by a screw 72 and a second end 74 secured to bridge 36 by suitable means (not shown). Each leaf spring 62 includes a free end 74 which carries a detent 76 engageable in notches 78 provided on an associated sector 58.

The arcuate portions 44 of dials 22, 24 and 26 are mounted below an arcuate top wall 80 having a first end 82 connected to the bracket 68 and a second end 84 connected to a horizontal partition 86 supported by side wall 42 and provided with a window 88. The top wall 80 is also provided with a window 90 through which the upper surface 92 of each arcuate portion 44 may be viewed. The upper surface 92 of dial 22 may carry indicia 14 in the form of three consonants c, b and d, as indicated somewhat schematically in FIG. 1. The upper surface 92 of dial 24 may be provided with indicia 14 in the form of the five vowels a, i, o, u and e, in this order, as indicated diagrammatically in FIG. 1. The upper face 92 of dial 26 may be provided with the consonants p, t and g, as indicated diagrammatically in FIG. 1. It will be apparent to those skilled in the art that indicia 14 are capable of sequential arrangement into several meaningful and, alternatively, several nonsense arrays 16. For example, as shown in FIG. 1, the indicia 14 have been arranged in a meaningful array spelling the word "cog." This array may be changed into a nonsense array by pivoting dial 24 about shaft 28 until the vowel "i" comes into view in window 90 so that array 16 comprises a nonword "cig." A user of toy 10 may sequentially arrange indicia 14 within window 90 by inserting his finger through window 90 and exerting sufficient pressure on dials 22, 24 and 26 to overcome the resistance offered by their associated detent means 60. In so doing, the user has actuated the first means 12 to sequentially arrange indicia 14 into meaningful or nonsense array 16.

Many other indicia may, of course, be utilized in the invention. Numerals, none of whose arrays can truly be said to be nonsense, pictorial indicia (such as pictures of animals to be aligned in family relationships), words or phrases, or combinations of all these (such as words on one means, pictures on another, and phrases on another) all may be used. In each case the invention provides for a response from the unit which is appropriate for the array arranged by the user, either for educational or amusement purposes.

The second means 18 responds to this actuation and includes phonograph means 94 for producing an audible response characteristic of the array 16 produced by actuation of the first means 12. For example, when the letters "c-o-g" are positioned in window 90, as shown in FIG. 1, the phonograph means 94 may produce a response as follows: "Very good. That is a word. The word is 'cog.' See the cog in the window." This refers to the window 88 in partition 86 through which a picture ring 96 is visible. The phonograph means 94 includes a phonograph record 98 having a plurality of sound tracks 100 each having a lead-in groove 102 (FIG. 3) positioned on the outer periphery 104 of record 98. There is a lead-in groove 102 for each response characteristic of the different arrays 16 which may be produced by actuating the first means 12. However, the nonsense arrays 16 may produce a single suitable response, such as "No, that is not a word."

The sounds recorded on sound tracks 100 are reproduced by a sound-reproducing means 106 including a tone arm 108 (FIG. 4) having a first end 110 pivotally connected by a pin 112 to a bracket 114 affixed to bottom wall 38. The tone arm 108 includes a free end 116 from which a phonograph needle 118 depends into operative association with sound tracks 100 and on top of which is mounted a transverse bridge 120 operatively associated with a speaker cone 122 connected to bridge 36 by a bracket 123 and a spider 123a and having a compression spring 124 biasing a vibration-transmitting cylinder 126 into engagement with bridge 120. The spring 124 also biases needle 118 into engagement with sound tracks 100. End 116 of tone arm 108 also carries an arcuate finger 128 which is engaged over a drawstring 130 which may be tensioned by pulling it in the direction of arrow 132. This lifts tone arm 108 upwardly in the direction of arrow 134 bringing needle 118 out of engagement with sound tracks 100 and swings needle 118 to the outer periphery 104 of phonograph record 98. Thus, needle 118 is returned to the same point-of-beginning each time drawstring 130 is pulled in the direction of arrow 132 to initiate an operating cycle of phonograph means 94, in a manner to be hereinafter described. Consequently, the angular position of record 98 will determine which lead-in groove 102 is engaged by needle 118 at the beginning of play. This angular position may be established by a sensing means 136 forming part of the second means 18 and including sensing fingers 138, 140 and 142 connected to dials 22, 24 and 26, respectively, by an associated crank arm 144 having an end 146 connected to a crank pin 148 carried by an associated hub 52. The fingers 138, 140, and 142 are reciprocably mounted in a guide 150 having a top wall 152, a closed end 154, an open end 156 and a slotted bottom wall 158. Fingers 138, 140 and 142 are caused to extend through slotted bottom wall 158 by the limited clearance existing between top wall 152 and bottom wall 158 and fingers 138, 140 and 142 at the points where there are cylindrical elements 162.

The phonograph means 94 includes a turntable 164 above which the guide 150 is supported by a pair of parallel arms 166, 168 each having an end 170 rotatably connected, by a hub 171, to a rocker shaft 172 rotatably supported above bottom wall 38 by a pair of posts 174, 176. The turntable 164 may be molded in one piece from suitable plastic material and includes an outer, annular channel 178 supporting record 98, a peripheral belt groove 180 receiving a governor belt 182, a peripheral, spiral groove 184 (FIG. 3) having an outer shallow portion 186 comprising 360° and an inner deep portion 188 also of 360° connected by a small region 192 where the depth changes uniformly. The turntable 164 also includes a central hub member 190 having a small-diameter portion 194 provided with a counter-bore 196 rotatably mounting turntable 164 on a fixed spindle 198 extending upwardly from bottom wall 38 to touch the centre one of the three hubs 52. Hub member 190 also includes a large-diameter portion 200 provided with a counterbore 202 forming a recess for hub members 52. The large-diameter portion 200 is provided with an annular groove 204 receiving individual loops 206 of drawstring 130.

Turntable 164 is driven by a clock spring 208 which may be wound up by pulling drawstring 130 in the direction of arrow 132 (FIG. 4) causing turntable 164 to rotate in a counterclockwise direction, as indicated by arrow 210 in FIG. 3. Upon release of drawstring 130, spring 208 rotates turntable 164 in a clockwise direction, as indicated by arrow 212 in FIG. 3, to energize sound-reproducing means 106. Unwanted undulations in record 98 are minimized by supporting annular channel 178 on a pair of narrow idlers 214, 216 and a wide idler 218, all of which are rotatably mounted on bottom wall 38 by upstanding brackets 220. The idler 218 is located beneath needle 118 and has a greater mass than the idlers 214, 216 for maximizing mechanical vibration imparted to needle 118 by acting as a high impedance support relative to the speaker system. Turntable 164 is provided with three rows of elongated openings 222, 224 and 226 and a plurality of rows of smaller openings 228 which may be engaged by sensing fingers 138, 140 and 142, in a manner to be hereinafter described, for stopping turntable 164 (and record 98) at a predetermined angular position during rotation of turntable 164 in the direction of arrow 210 during a windup operation so that a predetermined lead-in groove 102 will be positioned beneath needle 118 at the end of the windup operation.

The fingers 138, 140 and 142 are positioned radially with respect to record 98 by dials 22, 24 and 26 during sequential arrangement of indicia 14 into an array 16. If array 16 is a meaningful array, the radial positions of fingers 138, 140 and 142 will correspond to the radial positions on record 98 of a predetermined set of openings 230, 232 and 234, respectively, in one of the radial rows 228. If, on the other hand, the array 16 is a nonsense array, the radial positions of fingers 138, 140 and 142 will be such that they become engaged in one of the rows 222, 224 or 226 at the end of the windup operation determined by the initial letter. The radial position of guide 150 (which carries fingers 138, 140 and 142) may be stabilized by a finger 236 depending from box 150 into an annular channel 238 provided in turntable 164 radially inwardly from spiral groove 184. Fingers 138, 140 and 142 are normally held above turntable 164 by arms 166 and 168 and may be brought into engagement with turntable 164 by tensioning an intermediate portion 242 of drawstring 130 extending between fixed eyelets 244 and 246 carried by a bracket 248 affixed to bridge 36. Tensioning intermediate portion 242 moves an end 250 of a cantilevered spring 252 in the direction of arrow 243. Spring 252 includes a fixed end 254 supported by a block 256 extending upwardly from bottom wall 38. Spring 252 passes through an aperture 258 provided in a bracket 260 affixed to the free end 262 of a leaf spring 264 having a fixed end 266 attached to a plate 268 carried by arms 166, 168. Moving end 250 of spring 252 in the direction of arrow 253 also moves end 262 of spring 264 downwardly in the direction of arrow 270 urging box 150 toward turntable 164. However, box 150 is temporarily prevented from moving toward turntable 164 by a finger 272 (FIG. 5) swingably mounted on a pin 274 carried by a bracket 276 affixed to plate 268 (FIG. 4). Finger 272 rides in the shallow portion 186 of groove 184 for one full revolution of turntable 164 during the windup operation and then enters the deep portion 188 so that spring 264 may urge fingers 138, 140 and 142 into scanning engagement with turntable 164. This ensures that spring 208 will always contain at least one revolution of potential energy before arresting the turntable so that a satisfactory playback can be made. The groove 184 is so positioned that the fingers 138, 140 and 142 are lowered to the turntable 164 between slots 222, 224, 226 and the adjacent trio of smaller slots 228.

The speed of turntable 164 is controlled during playback by a governor, shown schematically in FIGS. 4 and 8 at 278, connected by belt 182 to turntable 164. The governor 278 includes a spindle 280 and may be one of the well known types used in toy phonographs, such as the governor shown in Pat. No. 3,017,187, and is supported from a bracket 328 by a plurality of bolts 329. Bracket 328 has a first end 330 affixed to bracket 68 by a bolt 332 and a second end 334 affixed to bottom wall 38 by a bolt 336. Since belt 182 is driven by turntable 164, governor 278 will also be driven when drawstring 130 is pulled to wind up drive spring 208. Governor 278 will then severely limit the speed of turntable 164 during pulling of drawstring 130, unless governor 278 is slipped in some way or the governing speed is changed. Such speed change is accomplished by a pair of variable diameter cones 282, 284 which locate on spindle 280. Each cone has a sloping face 286, a frusto-conical, small-diameter end 288 and a large-diameter end 290. Each end 290 is operatively associated with a collar 292 by suitable ball bearing means 294. Each collar 292 carries three arcuate tracks 295 which change in depth from approximately half a ball bearing diameter to just less than one bearing diameter. The collars are handed so that when driven by the belt in the wind-up direction, the cones rotate with respect to the collars and move together by rolling the balls up the arcuate tracks. During playback the belt turns the cones in the opposite direction so that the balls roll down the tracks and the cones separate so that the belt operates on a much smaller diameter. Thus the ratio of governor to turntable speed will be much less during winding than playback, thereby permitting rapid windup but slow playback.

Referring now more in particular to FIGS. 1, 2, 4 and 6, picture ring 96 is normally supported in an elevated position by a pair of arms 296, 298 each having a first end 300 affixed to rocker shaft 172 and a second end 302 provided with an inwardly-curved, upwardly-extending member 304 normally contacting ring 96. The arms 296, 298 are maintained in their normally elevated positions by spring 252 which passes through an aperture 306 provided in a crank arm 308 having an end 310 affixed to rocker shaft 172. Tensioning drawstring 130 during the windup operation moves end 250 of spring 252 in the direction of arrow 253 causing crank arm 308 to swing in the direction of arrow 312. This rocks shaft 172 in the direction of arrow 314 swinging arms 296, 298 toward bottom wall 38 so that ends 302 will be lowered permitting picture ring 96 to come to rest on posts 316 extending upwardly from bottom wall 38. The picture ring 96 carries a depending ramp 318 (FIGS. 4 and 6) having a sloping face 320 and a stepped notch 322 which lie in the path of travel of a peg 324, which is carried by turntable 164, when picture ring 96 is supported by posts 316. Peg 324 becomes engaged in notch 322 during the windup operation so that a plurality of pictures 326, which are provided on picture ring 96, will become synchronized with the openings provided in rows 222, 224, 226 and 228 and with the lead-in grooves 102 of the sayings recorded on phonograph record 98. When turntable 164 comes to rest at the end of the windup operation by the engagement of fingers 138, 140 and 142 in the openings in turntable 164, the correct picture 326 will be displayed through window 88 in platform 86. When drawstring 130 is then released, spring 252 moves upwardly causing spring 264 to lift box 150 and crank arm 308 to lift arms 296, 298. Members 304 then lift ring 96 to its normally elevated position where it remains stationary during a playback operation.

The pictures 326 may be indicative of the array 16. For example, as shown in FIG. 1, the picture of a cog comes into view in window 88 when letters c-o-g constitute array 16.

A lemon may be used for nonsense arrays, as shown at 326a in FIG. 3. In actual practice, suitable pictures will be used in place of the words identified as "pictures" 326 in FIG. 3.

Operation of toy 10 will be described in connection with FIGS. 1–3. A child-user may actuate the first means 12 by manipulating dials 22, 24 and 26 through window 90 to sequentially arrange indicia 14 into a meaningful array 16 comprising the word "cog." Manipulation of dials 22, 24 and 26 positions sensing fingers 138, 140 and 142, respectively, in a predetermined pattern such that they will engage only the openings 230, 232 and 234 which are aligned with the picture 326 which visually presents a cog.

Drawstring 130 may then be pulled in the direction of arrow 132 causing turntable 164 to rotate counterclockwise in the direction of arow 210 with finger 272 bottomed out in the shallow portion 186 of groove 184 (FIG. 5) so that fingers 138, 140 and 142 are held above turntable 164 for one revolution. The groove 184 then deepens lowering guide and fingers 138, 140 and 142 into scanning engagement with turntable 164 for sensing the openings provided therein. Continued rotation of turntable 164 brings the openings 230, 232 and 234 which identify the word "cog" under fingers 138, 140 and 142 which will then drop into their associated openings stopping turntable 164 with the appropriate lead-in groove 102 under needle 118. As drawstring 130 is initially tensioned, picture ring 96 is lowered onto posts 316 so that peg 324 on turntable 164 will engage notch 322 on picture ring 98 (FIG. 6) locking them together in synchronized relationship somewhere during the first revolution.

When drawstring 130 is released, picture ring 96 is returned to its elevated position with the picture of a cog 326 displayed in window 88. Simultaneously, needle 118 is lowered into engagement with lead-in groove 102 and turntable 164 begins rotating clockwise in the direction of arrow 212 under the influence of spring 208, which was wound up by counterclockwise rotation of turntable 164 in the direction of arrow 210.

Lead-in groove 102 will then lead needle 118 into a recorded message such as, "c-o-g spells 'cog.' A cog is another name for a gear."

If the child-user had sequentially arranged indicia 14 into a nonsense array 16 wherein the letters displayed in window 90 did not spell a word, fingers 138, 140 and 142 would have engaged one of the rows 222, 224 or 226 positioning a leading groove 102 under needle 118 which is associated with a recorded message such as, "That is not a word. Try again."

While the particular teaching machine toy herein shown and described in detail is fully capable of attaining the objects and providing the advantages hereinbefore stated, it is to be understood that it is merely illustrative of the presently preferred embodiment of the invention and that no limitations are intended to the details of construction or design herein shown.

What is claimed is:
1. A teaching machine toy, comprising:
first means identified by indicia capable of sequential arrangement into meaningmul or nonsense array;
second means for producing an audible response characteristic of the array produced by said first means;
said second means including mechanical sensing means positionable by said first means for sensing said characteristic response; and
said audible response-producing means including turntable means having a row of openings engageable by said sensing means only when said first means has been actuated to sequentially arrange said indicia into an array appropriate to said characteristic response, said sensing means engaging said openings to fix the angular position of said turntable means, and a phonograph record having a recorded-message, lead-in groove keyed to said openings.

2. A toy as stated in claim 1 wherein said first means comprises first, second and third dials and wherein said indicia comprise a first plurality of consonants printed on said first dial, a plurality of vowels printed on said second dial and a second plurality of consonants printed on said third dial, said second dial being mounted between said first and third dials.

3. A toy as stated in claim 2 wherein said toy includes (1) a picture ring having pictures displayed thereon which are characteristic of said responses and (2) means for keying said picture ring to said turntable in such a manner that an appropriate picture is brought into view when said phonograph record is played.

4. A toy as stated in claim 3 including a spring motor connected to said turntable means and manually actuable means connected to said turntable means for rotating it in one direction to wind said spring, said mechanical sensing means scanning said turntable means for said holes when said turntable means rotates in said one direction, said spring motor rotating said turntable means in a second direction opposite to said one direction upon completion of actuation of said manually actuable means.

5. A teaching machine toy, comprising a plurality of relatively movable means each having a plurality of indicia thereon, said movable means being selectively movable to arrange selected indicia from each in a desired array display;
sound producing means comprising carrier means separate from said movable means and having a plurality of complete sound recordings, each recording corresponding to a complete array of said indicia and sound pick-up means for selectively reproducing said sound recordings;
mechanical sensing means for sensing the particular array of indicia displayed on said movable means; and
said sound producing means being responsive to said sensing means for producing that particular sound corresponding to said particular array of indicia.

6. A teaching machine as defined in claim 5 wherein said relatively movable means comprise three adjacent dials, the indicia on two of said dials being consonants and the indicia on the other dial being vowels, said other dial being positioned between said two dials.

7. A teaching machine as defined in claim 6 wherein said sound carrier means comprises a phonograph record on a turntable; and a picture ring having pictures thereon corresponding to at least some of the possible arrays of said indicia; and means for keying said picture ring to said turntable to bring the appropriate picture into view when said phonograph record is played.

References Cited

UNITED STATES PATENTS

| | | | |
|---|---|---|---|
| 3,391,476 | 7/1968 | Sher. | |
| 2,656,617 | 10/1953 | Composto | 35—9 |
| 3,017,187 | 1/1962 | Ryan | 274—14 |
| 3,276,144 | 10/1966 | Feldman. | |
| 3,325,916 | 6/1967 | Greenlee. | |

EUGENE R. CAPOZIO, Primary Examiner

W. H. GRIEB, Assistant Examiner

U.S. Cl. X.R.

274—1